United States Patent [19]

Myhre

[11] Patent Number: 5,074,403
[45] Date of Patent: Dec. 24, 1991

[54] APPARATUS AND METHOD FOR TWO LOOP CONTROL OF VIBRATORY MATERIAL FEEDERS

[75] Inventor: John Myhre, Williamstown, N.J.

[73] Assignee: K-Tron Technologies, Inc., Wilmington, Del.

[21] Appl. No.: 350,153

[22] Filed: May 8, 1989

[51] Int. Cl.⁵ ............................................. B65G 25/00
[52] U.S. Cl. ..................................... 198/751; 198/769
[58] Field of Search ............... 198/751, 769, 761, 762; 318/128

[56] References Cited

U.S. PATENT DOCUMENTS

| | | | |
|---|---|---|---|
| 2,997,158 | 8/1961 | Moskowitz et al. | 198/769 |
| 4,049,997 | 9/1977 | McGhee | 318/128 |
| 4,331,263 | 5/1982 | Brown | 198/751 X |
| 4,350,243 | 9/1982 | Weyandt et al. | 198/769 |
| 4,354,618 | 10/1982 | Weyandt | 198/769 X |
| 4,441,060 | 4/1984 | Hamer et al. | 318/128 X |
| 4,496,884 | 1/1985 | Hamer et al. | 318/128 X |
| 4,594,636 | 6/1986 | Hamer et al. | 198/769 X |
| 4,663,574 | 5/1987 | Ward, Jr. | 318/128 |
| 4,677,353 | 6/1987 | Shieh | 318/128 |
| 4,811,835 | 3/1989 | Bullivant et al. | 198/262 |

FOREIGN PATENT DOCUMENTS

| | | | |
|---|---|---|---|
| 58-113014 | 7/1983 | Japan | 198/761 |
| 58-93814 | 11/1983 | Japan | 198/761 |
| 8602058 | 4/1986 | PCT Int'l Appl. | |

*Primary Examiner*—Joseph E. Valenza
*Assistant Examiner*—Cheryl L. Gastineau
*Attorney, Agent, or Firm*—Oliff & Berridge

[57] ABSTRACT

Control apparatus for a vibratory feeder has two control loops, one for controlling displacement amplitude and one for controlling displacement frequency. The two loops operate independently of each other, and use different feedback signals. The displacement amplitude control loop updates the amplitude of a continuous feeder actuator drive signal at a first predetermined rate, and the displacement frequency control loop updates the frequency of the drive signal at a second predetermined rate substantially slower than the first rate.

6 Claims, 8 Drawing Sheets

APPARATUS AND METHOD FOR TWO LOOP CONTROL OF VIBRATORY MATERIAL FEEDERS

BACKGROUND OF THE INVENTION

The present invention relates to vibratory material feeders driven in mechanical resonance.

Vibratory feeders exhibit many advantages over other types of material feeding systems such as belt feeders or motor driven auger feeders. For example, non-vibratory feeders, while exhibiting excellent long-term control over material feeding, often have non-uniform material feeding over the short term, and are often unacceptable for applications such as ingredient mixing which requires that specified material ratios be maintained at all times.

Vibratory feeders are also mechanically simplier than these other types of feeders because they operate without bearings, motor brushes, seals and the like. This results in a higher reliability and lower cost material feeder compared with other types of material feeders, and since vibratory feeders typically have no sparking electrical contacts, they are readily adaptable to highly explosive hazardous environments.

In addition, since the only component of the vibratory material feeder that is in direct contact with the material being fed is a feed tray, or the like, cleaning is greatly simplified. Vibratory feeders also exhibit excellent temperature stability, and are capable of operating with high efficiency; for example, feeding 25 tons of material per hour with only 60 watts electrical input.

However, commercially available vibratory feeders are not without disadvantage. For example, since vibratory feeders depend upon the frequency of mechanical resonance of the feeder, which varies with temperature, feed rates are affected by ambient temperature changes and temperature changes due to warm-up. Feeders driven from the power line exhibit a high degree of sensitivity to line voltage and frequency variation. Also, the material feed rate is often not easily controllable because of the non-linear relationship existing between the actual feed rate and a desired command value, and the fact that the feed rate is not zero based, (i.e., a power greater than zero must be applied to the vibratory feeder before material will begin feeding). This offset changes with type of material and material headload.

Another typical disadvantage of vibratory feeders is that they provide no indication of material feed which makes sensing of clogs and the like very difficult. Also, when materials of different densities are used, or when the feeding tray is changed, tedious mechanical tuning is required in order to reestablish the desired mechanical resonant point corresponding to the drive frequency of the vibratory actuator. Finally, since most feeders are driven with phase control of a voltage derived from a power line, unacceptable electrical interference is generated.

One attempt to control the amount of material fed by a vibrating machine is described in Japanese Patent No. 58-193814 to Muramatsu, wherein the actual oscillation frequency and amplitude of a vibrating unit are detected by separate detectors and the actual quantity of material conveyed by the machine is calculated therefrom. This is done simply by multiplying the detected vibrating frequency by the detected vibrating amplitude and comparing the value thus calculated with a similar value calculated for a quantity desired to be conveyed. The difference between the values is equalized by adjusting the frequency or amplitude of oscillation. However, such a system does not provide for control of the displacement amplitude and frequency independently of each other.

It has also been recognized that maximum efficiency occurs when a vibratory feeder is driven at the natural mechanical frequency of the system. However, conventional vibratory feeder systems are typically driven at a frequency different from the natural frequency because large and uncontrollable vibrations may occur unless sufficient damping is provided. For this reason, the conventional system is usually designed so that its natural mechanical frequency is above or below the electrical drive frequency resulting in a corresponding loss of efficiency.

Recently, attempts have been made to intentionally drive vibratory feeders at their natural frequency. However, such feeders have utilized complex control schemes which do not prov de independent control of vibration amplitude and frequency. One resonance type electromagnetic vibrating feeder is described in Japanese Patent No. 58-113014 to Nonaka, wherein the speed of transport of the body of the feeder is controlled while attempting to maintain resonance frequency vibration. Nonaka controls the transport speed by attempting to maintain the value obtained by multiplying the vibrating amplitude by the vibrating frequency (as described in Muramatsu, noted above). The control provided by Nonaka depends on a combined value obtained from amplitude and frequency detectors. More specifically, Nonaka includes a detector for detecting the difference between the frequency of the exciting force and the frequency of the vibrating force, and an amplitude detector. The actual frequency difference is compared to a desired frequency difference and is used by a DC-AC circuit to vary the exciting force frequency. The values from the two detectors are both fed to a multiplier and the value of the multiplication of the amplitude and frequency is then compared to an analogous value for a desired transport speed. The result is used, via an AC-DC circuit, to regulate the DC voltage level and thereby control the actual transport speed of the apparatus. Moreover, Nonaka attempts to maintain resonance by trying to maintain a particular mathematical relationship between the exciting force frequency and the vibrating force frequency.

Further, the Nonaka feeder seeks to maintain a selected speed of motion of the feeder trough and does not seek to maintain a particular amplitude of movement. In fact, the amplitude of movement of the trough of the feeder is freely varied for the purpose of maintaining transport speed. That is, Nonaka does not maintain a selected amplitude of displacement, regardless of transport speed, and independently of the means for maintaining resonance.

Another resonance type electromechanical feeder device is described in Patent Cooperation Treaty Application No. WO 86/02058 (Pross, et al.), which appears to measure the resonance frequency and oscillation amplitude of a mass oscillating system and then alters the excitation voltage of the drive mechanism to cause the actual oscillation frequency to approach, but not match, the resonance frequency of the system. More particularly, an electromagnetic measuring coil and magnet sensor arrangement generates a voltage whose amplitude is proportional to the degree of amplitude of oscillation of a material holding trough, and whose frequency is compared with an excitation frequency. The sensor is used to generate energizing pulses of varying duration, timing and frequency which are applied to the excitation coil of the drive mechanism, resulting in adjustment of the actual frequency and amplitude of oscillation of the feeder.

Other resonance type vibratory feeders seek to control both the amplitude and frequency of feeder vibration using single sensor arrangements. One example of such systems is disclosed in U.S. Pat. No. 4,331,263 to Brown, wherein the amplitude and frequency of vibration are sensed by detecting the third harmonic of the drive current signal.

SUMMARY OF THE INVENTION

Accordingly, it is a primary object of the present invention to provide a vibratory material feeder enabling independent maintenance of a desired displacement amplitude and maintenance of feeder operation at the natural mechanical resonance of the feeder.

According to one aspect of the present invention, the amplitude and frequency of displacement of a vibratory material feeder are maintained by two control loops which operate independently of each other, at two different cycle rates, using different feedback signals, to periodically update an actuator drive signal.

In accordance with a further aspect of the present invention, an amplitude displacement control algorithm preferably is used which includes five steps: (1) determination of the actual displacement; (2) comparison of the actual displacement with the programmable maximum displacement and with the desired displacement; (3) calculation of the output signal amplitude; (4) adjustment of the amplitude of the output signal to maintain the displacement at the desired displacement; and (5) repeating the cycle of steps 1-4 at a first predetermined repetition rate In accordance with still another aspect of the present invention, a resonance control algorithm preferably is used which includes four steps: (1) determination of the I-crossing signal, defined as the time between the voltage signal crossing zero and the current signal crossing zero; (2) calculation of the actual phase angle, defined as the ratio of the I-crossing time divided by the period of the output frequency multiplied by 360 degrees; ratio, defined as the phase angle divided by the output frequency, is minimized; and (4) repeating the cycle of steps 1-3 at a second repetition rate slower than said first repetition rate.

According to a further aspect of the invention, resonance is maintained by minimizing a phase angle difference between sinusoidal drive voltage and current wave forms. Thus, the vibratory feeder of the present invention operates in resonance, thereby maximizing efficiency, and with accurate control of material feed and without exciting the system with harmonics higher than the drive frequency applied.

The preferred embodiment is a microprocessor based controller including a wave form generator for synthesizing the sinusoidal voltage drive wave form. This synthesized wave form is varied in frequency and amplitude under control of the microprocessor in order to maintain the vibratory feeder in mechanical resonance at the desired flow rate.

Because mechanical resonance and tray displacement amplitude are separately measured and independently controlled, reliability and accuracy are improved.

The frequency of the applied power is periodically adjusted in order to maintain a minimum phase shift between the sinusoidal voltage and current applied to the electromagnetic vibrator. The present invention seeks out the point of mechanical resonance and varies the frequency of applied electrical power to correspond to that mechanical resonance. The present invention is therefore not dependent on the stability of the power line frequency, and does not require mechanical tuning of the vibratory system. The invention is also capable of tracking the mechanical resonance despite changes due to ambient temperature or warm-up.

It has been found that an applied frequency range of between 30 and 80 Hz is acceptable for most vibratory material feeder applications. By externally programming the microprocessor embodying the present invention, it is possible to customize a particular controller for highly accurate application within a desired frequency range or material flow range. This programability can be accomplished with the use of external switches, or the like, which allow a single controller to be used with an entire range of vibratory feeders.

Other objects, features and advantages of the present invention will become apparent to those skilled in the art from the following detailed description of the preferred embodiment with specific reference to the drawing.

DETAILED DESCRIPTION OF THE PREFERRED EMBODIMENT

Figure 1:
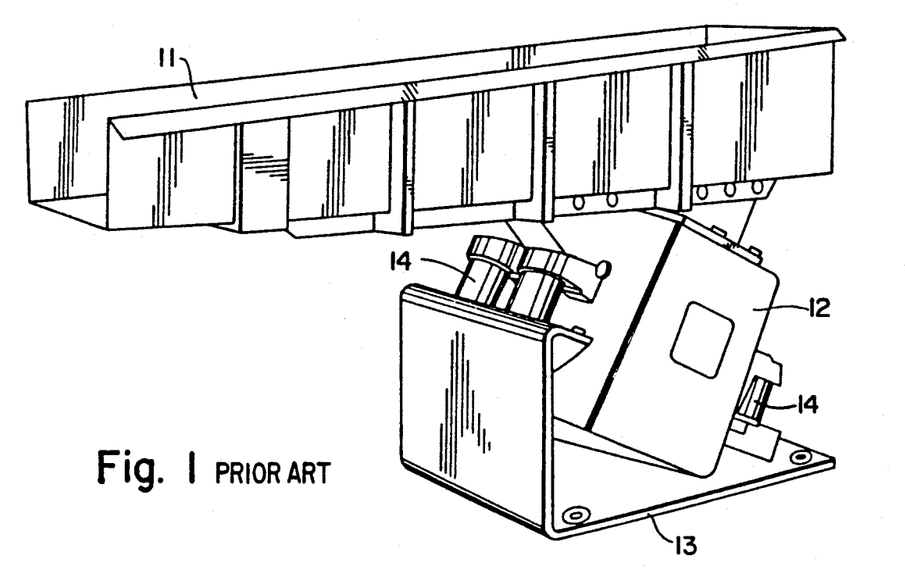
FIG. 1 is a mechanical detail of a vibratory feeder of the present invention.

Referring to FIG. 1, the mechanical detail of a vibratory material feeder of the present invention is shown. The mechanical structure of the feeder, and the electromechanical actuator can be, for example, that presented in U.S. Pat. No. 2,997,158, issued Aug. 22, 1961, the disclosure of which is incorporated herein by reference.

The feeder includes a tray assembly 11 which is vibrated by an electromechanical actuator 12 which, in turn, is mounted to base 13. Base 13 is typically fixedly mounted to a mounting member (not shown).

Actuator 12 is suspended from base 13 by flexible mountings 14 which aid in mechanically isolating the vibrating system comprising tray 11 and actuator 12 from base 13.

Figure 2:
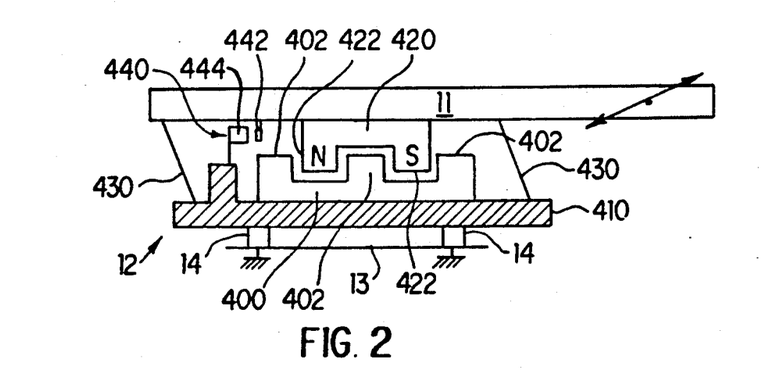
FIG. 2 is a diagrammatic view of the actuator of the vibratory feeder of FIG. 1.

Referring to FIG. 2, actuator 12 includes an electromagnet or drive coil 400 mounted to the actuator housing 410 and comprising an E-shaped, coil-wrapped core having three spaced upstanding legs 402, and a C- shaped permanent magnet 420 mounted to tray 11 opposite drive coil 400 and having two spaced depending legs 422 interposed between the drive coil legs 402 so as to straddle the middle leg 402, as shown. Tray 11 is mechanically coupled to actuator 12 by vibratory springs 430. Actuator 12 is driven by a substantially sinusoidal voltage drive wave form. As actuator 12 vibrates, tray 11 will be moved alternately to the left and right, which will urge material lying in the rear part of tray 11 to be advanced along tray 11 toward the left in a series of hops or jumps. The distance between hops is determined by the tray displacement (i.e., the change in distance between the center lines of drive coil 400 and permanent magnet 420). The frequency (number of hops per second) is determined by the tray's oscillatory frequency. Thus, actual motion of the material is a combination of the tray displacement and frequency. Although not shown, it will be understood that as material discharges from the left of tray 11, new material is supplied to tray 11 from a material hopper or the like.

Actuator 12 also includes, as shown, a tray displacement sensor 440 comprising a permanent magnet 442 mounted to tray 11 and a measuring coil 444 mounted to actuator housing 410 adjacent magnet 442 so as to produce a sine wave feedback signal whose amplitude is directly proportional to the tray displacement. The feedback signal is calibrated by changing the distance of measuring coil 444 from magnet 442.

Figure 3:
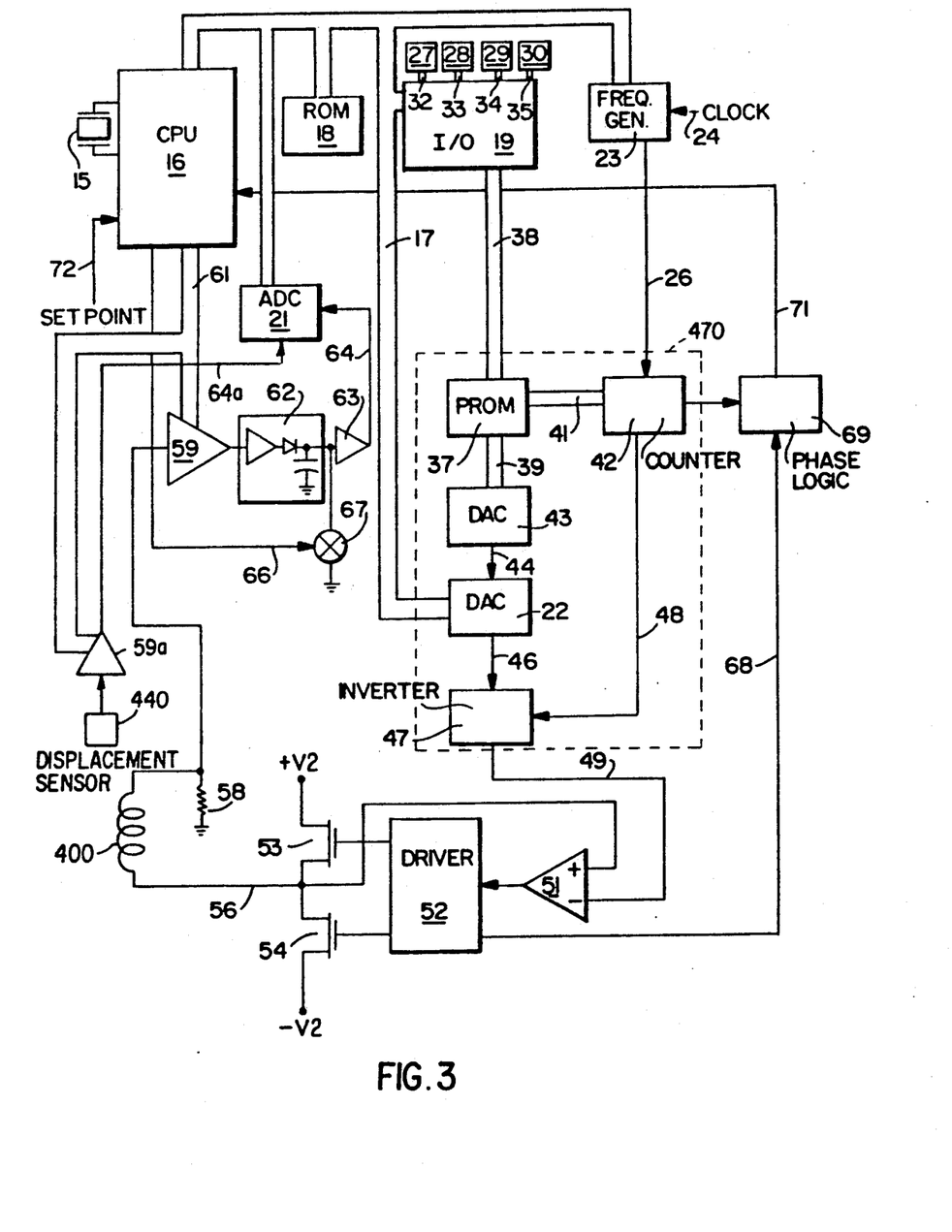
FIG. 3 is a block diagram of the control system of the invention.
Figure 4:
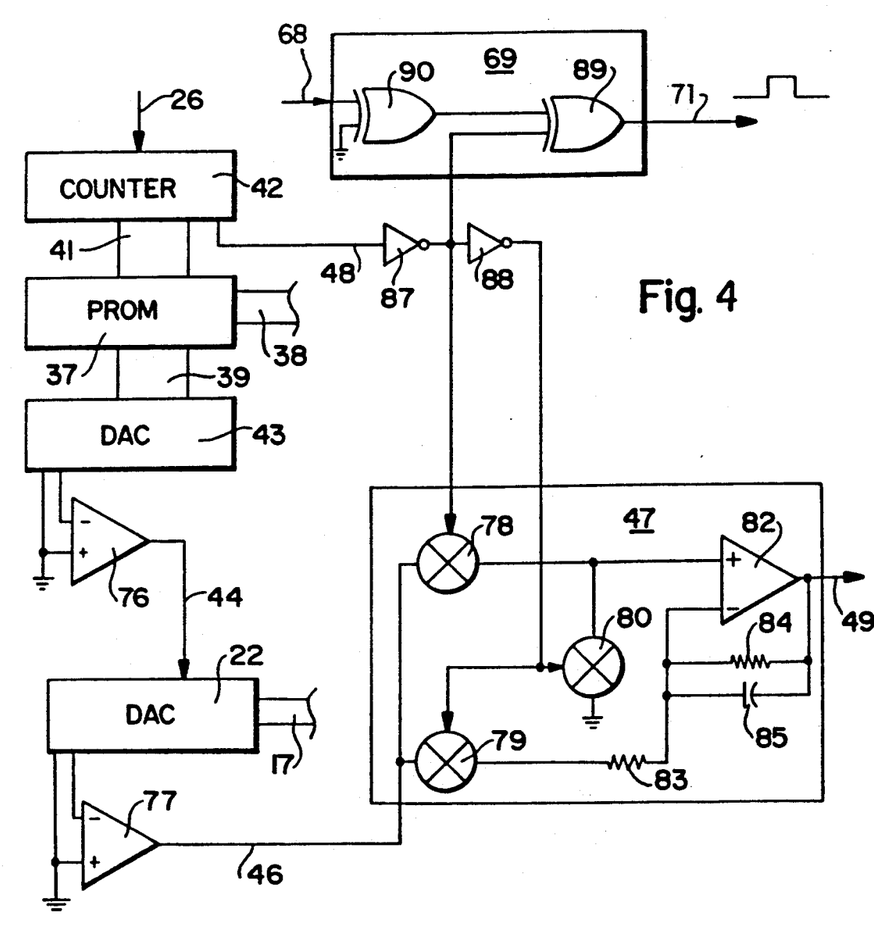
FIG. 4 is a detailed schematic of the wave form generating section of FIG. 3.

Referring to FIGS. 3 and 4, the preferred embodiment of the control system is based around a central processing unit (CPU) 16 which can be, for example, a type 8031 microprocessor manufactured by Intel Corporation. A system clock signal of 7.3728 MHz is provided to CPU 16 by crystal oscillator 15. Connected to CPU 16 by data/address bus 17 are read only memory (ROM) 18, input/output (I/O) controller 19, analog to digital converter (ADC) 21 and digital to analog converter (DAC) 22.

In the preferred embodiment, ROM 18 is a type 27C64 EPROM programmable memory, and I/O controller 19 is a type 81C55 controller, both manufactured by Intel Corporation. ADC 21 can be, for example, a type 0844 analog to digital converter, and DAC 22 can be a type 0832 digital to analog converter, both manufactured by National Semiconductor Corporation.

Also connected to bus 17 is a variable frequency generator 23. Generator 23 can be, for example, a type 7955 frequency multiplier, manufactured by LSI Logic Corporation. Generator 23 accepts a high frequency clock signal on line 24, derived, for example, by dividing the system clock signal from oscillator 15, and produces a signal on line 26 which is a pulse stream containing a fraction of the pulses on clock line 24, dependent upon the value of the digital byte applied to generator 23 through bus 17. Thus, the frequency of pulses on line 26 is a fraction of the frequency of the pulses on line 24, the fraction being determined by the byte appearing on bus 17 under control of CPU 16.

Connected to I/O controller 19 are external switches 27-30 connected to controller 19 by four-bit buses 32-35, for permitting the operator to set various operating parameters. Switches 27-30 each can be, for example, a type 74B10 binary coded rotary switch manufactured by Grayhill Corporation.

As will be described more fully, DAC 22, in cooperation with a programmable read only memory (PROM) 37, a further DAC 43 responsive to PROM 37, and an inverter 47 responsive to PROM 37 serve as a DAC driver assembly 470 for providing control signals to an actuator driver 52. PROM 37 is used to store digital representations of half-period sinusoidal wave forms for the wave form generator of the present invention. PROM 37 can be, for example, a type 2732 EPROM manufactured by Intel Corporation. To improve accuracy and flexibility, 16 different magnitudes of half-period sinusoids are stored in PROM 37. An individual wave form is chosen by controller 19 through control bus 38 under control of CPU 16. The individual wave forms in PROM 37 are digitized into 256 different 8-bit values. Each 8-bit value is recalled from PROM 37 and appears on bus 39 when addressed by bus 41 from counter 42. Counter 42 is driven by the variable frequency digital signal appearing on line 26 produced by frequency generator 23. Counter 42 can be, for example, a type 4040 counter available from Motorola Corporation. Counter 42 and PROM 37 cooperate to produce on bus 39 a series of 8-bit bytes representing a full-wave rectified sinusoidal wave form, the frequency of which is controlled by the frequency of the pulses on line 26, and the magnitude of which is controlled by CPU 16 via controller 19 through bus 38.

This digital representation on bus 39 is applied to DAC 43 which produces, on line 44, an analog full-wave rectified sinusoidal wave form corresponding to the digitized wave form appearing on bus 39. Line 44 is applied to DAC 22 which acts as a digitally controlled attenuator which is used to further refine the magnitude of the full-wave rectified sinusoidal wave form. DAC 22 can be, for example, a type 0832 digital to analog converter available from National Semiconductor Corporation. DAC 22 produces on line 46 a full-wave rectified sinusoidal analog wave form which has been reduced in magnitude from the analog wave form appearing on line 44 according to the byte applied to DAC 22 via bus 17 by CPU 16. Thus, coarse magnitude control is accomplished with PROM 37, and fine magnitude control is accomplished with DAC 22.

The full-wave rectified sinusoidal wave form appearing on line 46 is applied to controllable inverter 47 which is controlled by line 48 from counter 42. Inverter 47 is effective to selectively invert every other half period of the full-wave rectified wave form on line 46, to produce on line 49 a full wave unrectified sinusoidal wave form.

As a result, a precisely synthesized sinusoidal wave form is produced on line 49. In the present invention, the frequency of the signal appearing on line 49 is variable from 30 to 80 Hz in variable increments ranging approximately from 0.5 to 0.01 Hz, with a magnitude variable from 0-5 Volts in increments of approximately 18 mV. These minimum increment sizes represent hardware limitation of the preferred embodiment. It will be understood that different increment sizes may be had with appropriate hardware changes.

The sinusoidal wave form on line 49 is applied to amplifier 51 and, in turn, to power driver 52. Power driver 52 drives power transistors 53 and 54 which are connected to positive and negative high voltage rails $+V2$ and $-V2$. Transistors 53 and 54 are commonly connected to line 56 which is connected to drive coil 400 of actuator 12 (FIG. (2). Thus, coil 400 is driven with a sinusoidal wave form having precisely controlled magnitude and frequency.

The current returning from coil 400 passes through precision sense resistor 58 which produces a voltage proportional to the sensed current. This voltage is applied to variable gain amplifier 59, the gain of which is varied under control of CPU 16 through bus 61. Depending on the magnitude of the current, the gain of amplifier 59 is varied by CPU 16 to provide the highest possible resolution. The output of amplifier 59 is applied to sample/hold circuit 62 which serves to detect the peak of the sinusoidal current wave form. This peak is buffered by amplifier 63 and applied to ADC 21 through line 64 which in turn, applies an 8-bit byte representative of the sensed current peak to CPU 16 via bus 17.

As a result, the magnitude of the peak of the current passing through coil 400 is supplied to CPU 16 for processing. To sense a new peak current, sample/hold circuit 62 is reset under control of CPU 16 acting through line 66 and analog switch 67. Of course, other means may be employed to sense the current passing through coil 400 as long as indication of the magnitude of the current is supplied to CPU 16.

The feedback signal from displacement sensor 440 is amplified by a scaling amplifier 59a, the gain of which is varied under control of CPU 16 through bus 61, and supplied to ADC 21 through line 64a.

Analog switch 67, and all other analog switches in the present disclosure, are digitally controlled analog switches, for example, type DG 211 switches manufactured by Analog Devices Corporation.

Power driver 52 also provides a signal on line 68 which is a square-wave signal having transitions coincident with the zero-crossings of the current applied to coil 400. This provides informaton on the phase of the current.

Line 68 is applied to phase logic block 69 along with the voltage phase information produced by counter 42 on line 48. Phase logic 69 produces a pulse on line 71 having a pulse width corresponding to the phase difference between the voltage and current applied to coil 400. This phase pulse is provided to CPU 16 for processing.

Thus, CPU 16 calculates a magnitude and fequency of voltage to be applied to coil 400, and is provided with information regarding the magnitude and phase of the current passing through coil 400, and the magnitude of the tray displacement. CPU 16 uses this information, as disclosed below in detail referring to FIGS. 7 and 8A-8B, in combination with the desired setpoint applied to CPU 16 through line 72, to maintain the vibratory feeder in a mechanical resonance, and to feed material at the desired flow rate according to the setpoint.

In the preferred embodiment, the set point signal on line 72 is a variable frequency digital signal having a frequency proportional to the desired material flow rate.

Figure 5:
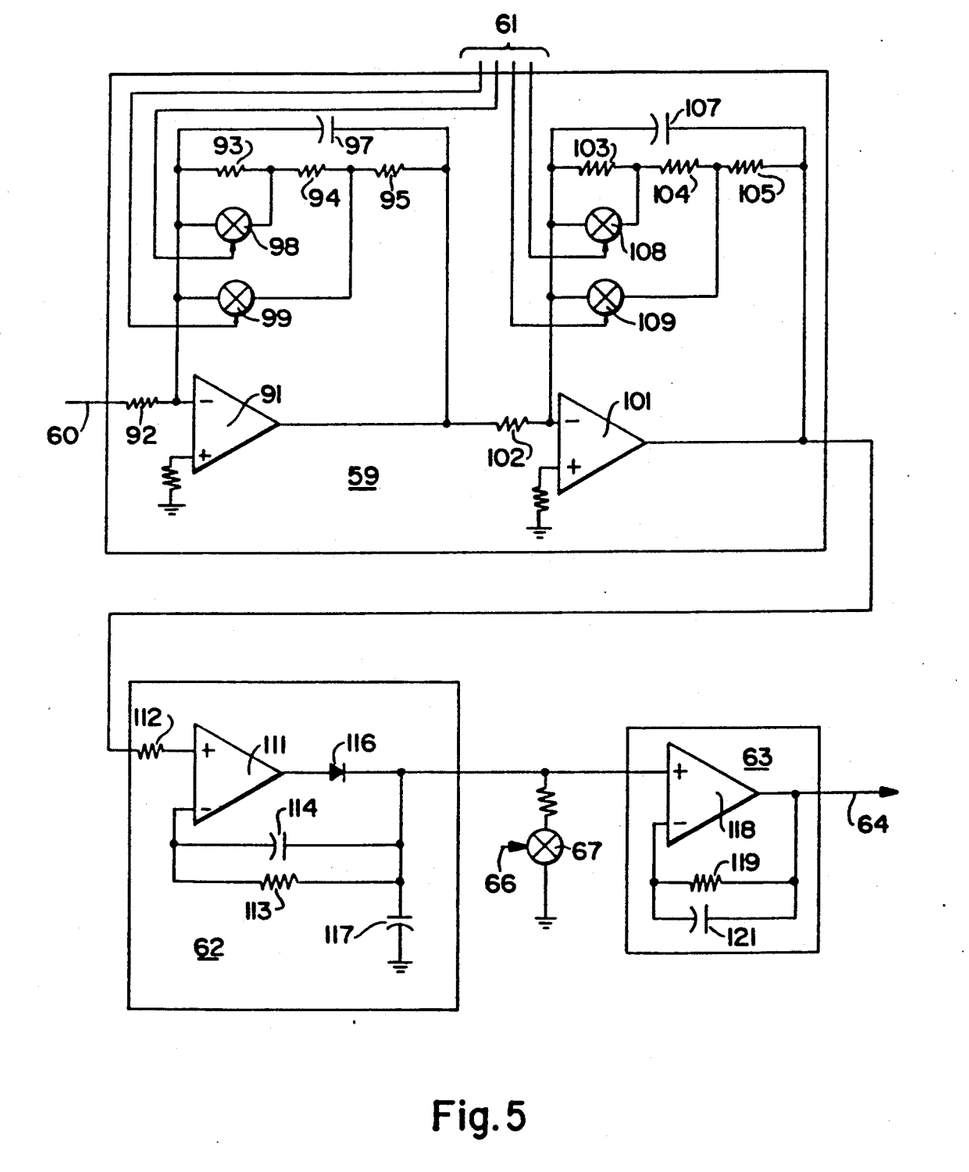
FIG. 5 is a detailed schematic of the current peak signal conditioning section of FIG. 3.

Referring to FIGS. 4 and 5, the wave form generating and current peak signal conditioning circuits are discussed in detail.

The pulse stream frequency control signal on line 26 is applied to counter 42 which produces an 8-bit count on bus 41. This 8-bit count is applied to PROM 37 along with wave form selection information on bus 38 from controller 19 (FIG. (3). One of 16 digitized half-period sinusiodal wave forms stored in PROM 37 is chosen under control of bus 38, and one of 256 individual digitized points on the chosen wave form is selected under control of the count on bus 41. This digitized value is produced as an 8-bit byte on bus 39 and is applied to DAC 43. The output of DAC 43 is buffered by amplifier 76 to produce on line 44 a full-wave rectified sinusoidal analog voltage wave form corresponding to the sequence of 8-bit information on bus 39.

The analog signal on line 44 is applied to DAC 22 which is also connected to bus 17 from CPU 16 (FIG. (3). The output of DAC 22 is buffered by amplifier 77 to produce on line 46 a fullwave rectified sinusoidal analog voltage wave form. Buffer amplifiers 76 and 77 can be, for example, type 3240 operational amplifiers available from RCA Corporation.

The full-wave rectified wave form is applied to controllable inverter 47 which is also connected to line 48 from counter 42.

Line 48 is a digital signal having transitions which occur at the end of each half period of the full-wave rectified signal on line 46. In other words, a transition occurs on line 48 at the end of every 256 pulses occurring on line 26 as counted by counter 42.

Controllable inverter 47 comprises analog switches 7880 and operational amplifier 82 with gain and feedback provided with resistors 83 and 84 and capacitor 85. Amplifier 82 can be a type 3240 operational amplifier available from RCA Corporation. Line 48 is applied to inverters 87 and 88 to control analog switches 78–80. This results in a full-wave unrectified sinusoidal analog signal appearing on line 49.

The voltage phase signal appearing on line 48 is also applied, via inverter 87, to XOR gate 89 along with the output of XOR gate 90. The current phase signal appearing on line 68 is applied to XOR gate 90 which acts as a buffer. The output of gate 89 is a pulse having a width corresponding to the phase difference between the voltage and current.

Referring to FIG. 5, the details of the current peak sensing circuitry are disclosed. The sinusoidal current wave form on line 60, produced by sense resistor 58 (FIG. 3), is applied to variable gain amplifier 59.

Variable gain amplifier 59 comprises two similarly configured stages. A first stage includes operational amplifier 91 with gain resistors 92–95, and compensation capacitor 97. The effective value of the feedback resistance, and thus the gain of the first stage, is controlled by analog switches 98 and 99 under control of two lines from bus 61 connected to CPU 16 (FIG. 3).

The second stage of variable gain amplifier 59 includes operational amplifier 101 with gain resistors 102–105 and capacitor 107. Analog switches 108 and 109, under control of the two remaining lines of bus 61 are effective to modify the feedback resistance of amplifier 101, and thus the gain of the second stage is varied.

Amplifiers 91 and 101 can be, for example, type LF 412 operational amplifiers manufactured by National Semiconductor Corporation.

Variable gain amplifier 59 is therefore capable of 16 different gain settings under control of CPU 16 (FIG. 3) through bus 61 in order to provide the highest possible resolution when sensing the current.

The output of variable gain amplifier 59 is applied to sample/hold circuit 62 which comprises operational amplifier 111 gain resistors 112 and 113, compensation capacitor 114, rectifier 116 and storage capacitor 117. Connected between storage capacitor 117 and ground is analog switch 67 which is controlled by CPU 16 through reset line 66. The voltage on capacitor 117 is periodically reset by analog switch 67 under control of CPU 16 in order to update the peak current measurement.

Buffer amplifier 63, comprising operational amplifier 118, resistor 119 and capacitor 121, serve to provide a buffered signal on line 64 corresponding to the voltage on capacitor 117. Line 64 is then applied to ADC 21 to be digitized and applied to bus 17 for use by CPU 16 (FIG. 3). Amplifiers 116 and 118 can be, for example, type 3240 operational amplifiers available from RCA Corporation.

Figure 6:
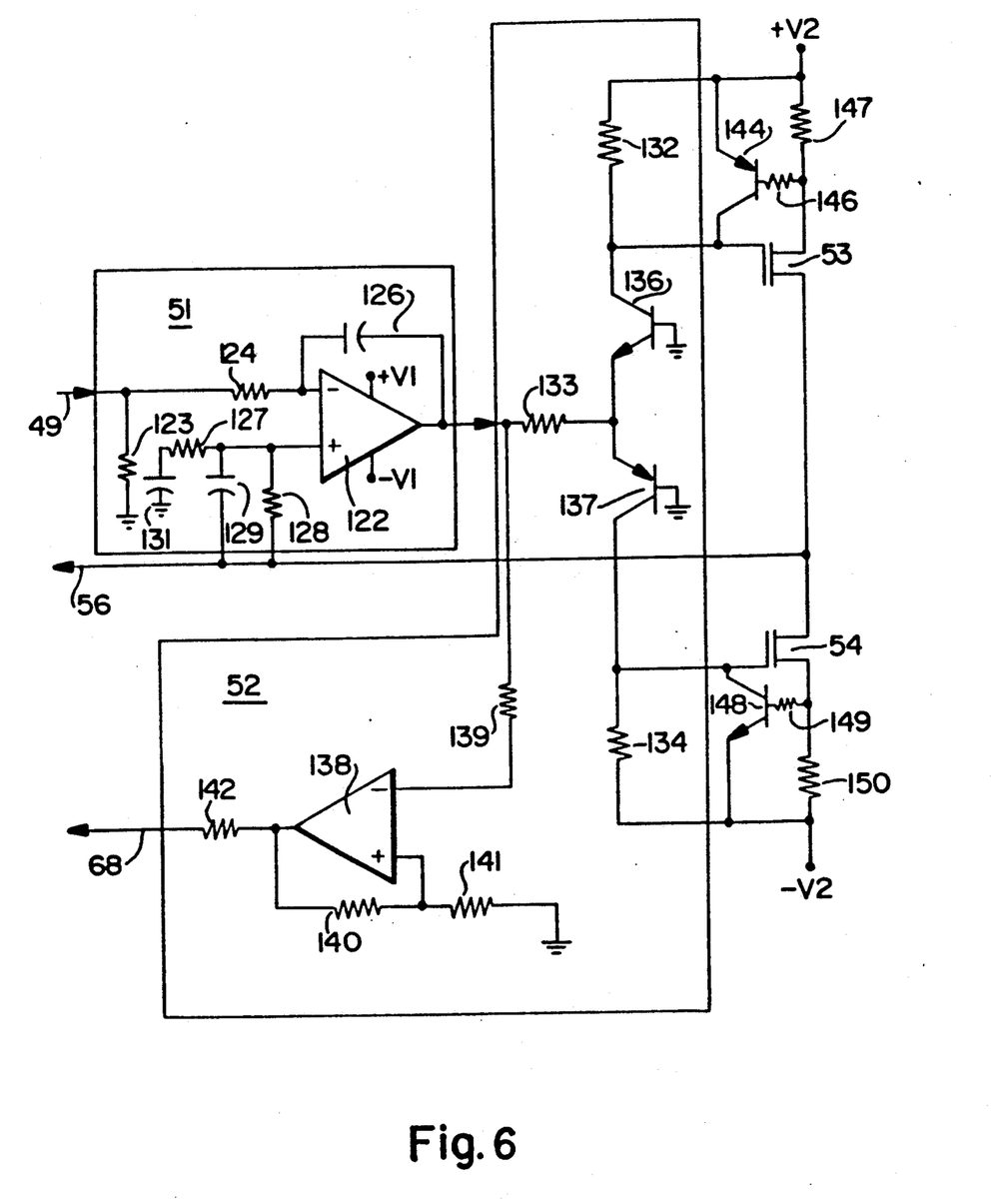
FIG. 6 is a detailed schematic of the power section of FIG. 3.

Referring now to FIG. 6, disclosed is the power section of the present invention. The sinusoidal voltage on line 49, produced by controllable inverter 47 (FIG. 3), is applied to amplifier 51. Amplifier 51 comprises operational amplifier 122 which is powered from positive and negative voltage rails +V1 and −V1 (for example, + and 7.5 Volts). Amplifier 122 is con figured with resistors 123 and 124 and capacitor 126. Feedback from power output line 56 is provided with resistors 127, 128 and capacitors 129 and 131. The output of amplifier 51 is applied to power driver 52 which includes resistors 132, 133 and 134 and transistors 136 and 137. Also provided as part of power driver 52 is current phase detecting amplifier 138 configured with resistors 139–142. Amplifier 138 produces on line 68 a bipolar squarewave signal with transitions coincident with the zero crossing of the current supplied by line 56. Amplifiers 122 and 138 can be, for example, type TL082 operational amplifiers available from Texas Instruments Corporation.

Power driver 52 is used to drive the gates of power field effect transistors (FETs) 53 and 54. These power FETs can be, for example, type 2SJ56 and 2SK176 metal oxide semiconductor field effect transistors (MOSFETS), respectively, manufactured by Hitachi Corporation. Transistors 53 and 54 are respectively connected to positive and negative high voltage rails +V2 and −V2 (for example + and −80 Volts). Transistors 53 and 54 are commonly connected to power output line 56 which is connected to drive coil 400 (FIG. 3).

Transistor 144 and resistors 146 and 147 provide over current protection for transistor 53, and transistor 148 and resistors 149 and 150 provide over current protection for transistor 54.

Although the configuration shown in FIG. 5 is a push-pull type linear amplifier, it will be understood that other types of amplifiers may be employed including switching type amplifiers.

Referring to the combined flow chart of FIG. 7, the control algorithms used to control tray displacement and resonance vibration in accordance with the present invention will now be described. As shown, two control loops are provided, which operate independently at different cycle rates to provide separate amplitude and frequency control signals at different update frequencies. However, the control signals are applied to the common DAC driver assembly 470 (FIG. 3), which is responsive to both control inputs and maintains the amplitude and frequency of its output at the vaules determined by the last control signal inputs from the respective control loops, so that an output signal to actuator 12 is always maintained. Preferably, the displacement control loop is the primary control loop, providing updated amplitude control signals 10 times more frequently than the resonance tracking control loop, e.g., 20 times per second versus 2 times per second.

The displacement control loop enables adjustment of the output drive signal voltage amplitude to maintain the displacement of tray 11 of the vibratory feeder at the desired displacement selected by the user. Preferably, as shown, the displacement control loop includes five steps.

In step 200, the tray displacement is determined by detecting the largest voltage peak produced by feedback sensor 440 during the last control cycle (e.g., the last 1/20th of a second). As will be appreciated, this is readily accomplished by CPU 16 in response to the output of ADC 21. That is, CPU 16 samples the output from ADC 21 as fast as possible for one control cycle, e.g., at a sampling rate of approximately 80 microseconds per reading, which is less than one degree of the feedback signal sine wave, and produces less error than the conversion error caused by an 8-bit analog-to-digital converter.

In the second step of the displacement control loop (step 201), the measured displacement (feedback signal peak value) is compared with alarm limits to check for signal anomalies. For example, if the measured displacement is greater than the programmable maximum displacement, an alarm is generated, and if the measured displacement is less than the desired displacement at 100% output signal, another alarm is generated. If no alarm condition is detected in step 201, the output drive signal voltage amplitude $A_{dr}$ is then calculated as The set point signal inputted by the operator on line (FIG. 3) is tested to determine whether it is the first nonzero set point signal (step 202a); and if not then $A_{dr}$ is calculated (step 202b) using the formula:

$$A_{dr}(i) = A_{dr}(i-1) + (\sqrt{D/S} - 1)\text{*Damp} + 1$$

where:
  $A_{dr}(i)$ = The new output drive signal voltage amplitude.
  $A_{dr}(i-1)$ = The previous output drive signal voltage amplitude.
  D = The measured tray displacement (the feedback peak value from step 200).
  S = The desired tray displacement as indicated by the inputted set point signal.
  Damp = The control gain, which testing has shown advantageously should be 0.12 in the KV-2 and KV-3 systems manufactured by applicant's assignee.

The set point signal advantageously has a frequency which varies between 0 and 10 KHz. Hence the value S advantages is $$S = \left( \text{set } \frac{\text{point signal}}{10,000} \text{ frequency} \right) * \text{(Scale Factor)}$$

where Scale Factor is determined by the maximum A/D reading that ADC 21 can produce.

If the inputted set point signal is determined in step 202a to be the first non-zero signal, then an initialization procedure is followed (step 202c) in which a temporary drive signal amplitude Adrt is calculated based on the Scale Factor as follows:

$$TEMP = \sqrt{S/D}$$

$$TEMP = (TEMP-1)\text{*Damp}$$

$$TEMP = TEMP + 1$$

$A_{dr}(i) = TEMP^* A_{dr}(i-1)$

Next, in step 203 the output drive signal amplitude value $A_{dr}$ calculated in step 202 (202b or 202c) is applied as a control signal to DAC driver assembly 470.

In the final step 205, CPU 16 waits for the next displacement control cycle to begin and then repeats steps 200-204 as described hereinabove. Repeated cycling of the displacement control loop at the preferred high cycle rate enables continuous adjustment of the feeder actuator 12 to maintain the desired displacement of tray 11.

Figure 7:
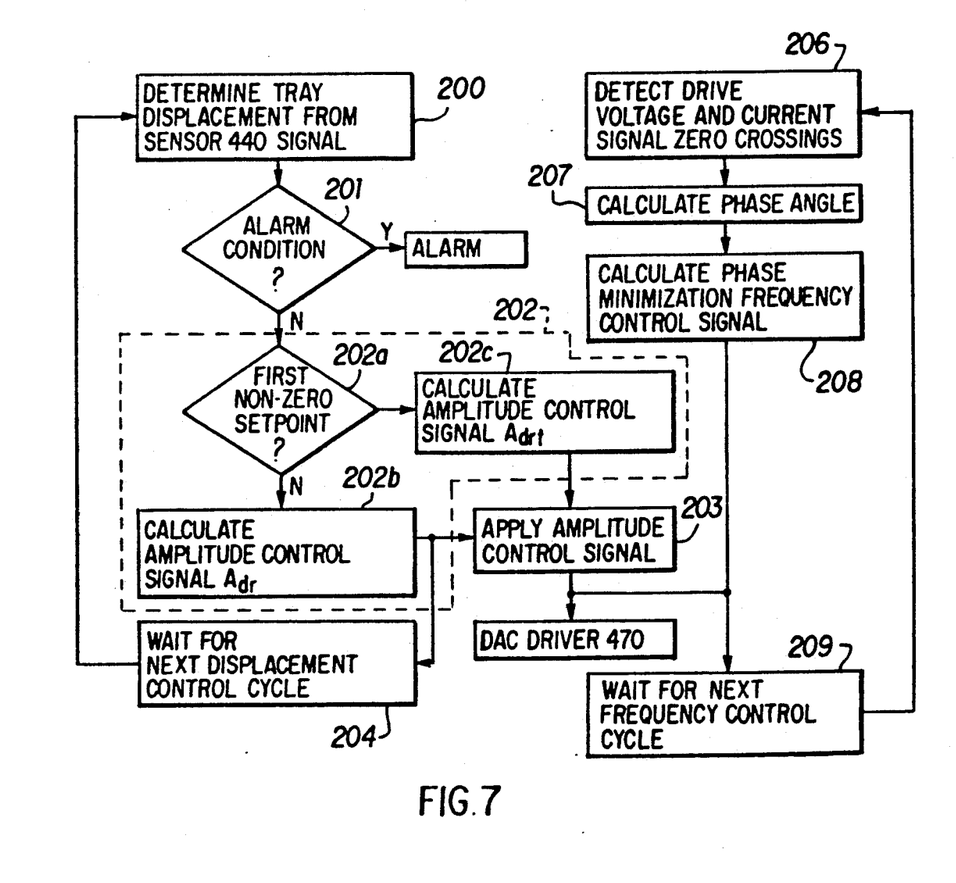
FIG. 7 is a combined flow chart of the displacement control loop and the resonance tracking loop of the invention.

Still referring to FIG. 7, the resonance tracking loop preferably includes four main steps. In step 206, an I-crossing signal is generated in the manner described in more detail herein below indicating the time between the drive voltage signal crossing zero and the drive current signal crossing zero.

The second step (step 207) is to calculate the actual phase angle in degrees. This calculation is the ratio of the I-crossing time divided by the period of the output drive signal frequency multiplied by 360 degrees. The resulting value is an average value of the phase angles occurring during the cycle time.

In the third step 208, a new output frequency based on phase minimization is calculated. The reason for this step is that the system is closest to resonance when the vibratory motor is operated with a minimum phase angle. This step monitors the phase ratio, defined as the phase angle divided by the output frequency. The resonance tracking loop, therefore, seeks to maintain a minimum phase ratio.

As described in more detail herein below, minimization of the phase ratio is accomplished by changing the output drive frequency in small steps until the minimum phase ratio is sensed. For example, if the phase ratio exceeds the minimum, the output frequency is reduced in small increments and the resulting reduced phase ratio after each incremental change is calculated. This continues until the ratio begins to increase, which indicates that the phase ratio minimum has been passed. At that point, the direction of the output frequency incremental changes is reversed.

Preferably, if the tracking direction changes within, for example, five incremental output frequency step changes, a smaller frequency step change size is then used. If the tracking direction change then takes more than, for example, three incremental output frequency step changes, the step size is increased again. On the other hand, if the tracking direction change takes more than five steps, the step size is increased. This enables tight control with a steady resonance point and enables the system to track the resonance point quickly. The resulting output frequency signal is applied to DAC driver assembly 470, which provides an analog output drive signal which is used to alter the vibration frequency of actuator 12, and thereby match the natural resonance frequency of the feeder system.

In the final step 209, CPU 16 waits for the next resonance control cycle to begin, and then repeats steps 206-209 as described hereinabove. Repeated cycling of the resonance control loop at the preferred low cycle rate relative to the displacement control loop cycle rate allows the turndown abilities of actuator 12 to be optimized and to maintain resonance efficiently in the face of changing conditions.

Figure 8A:
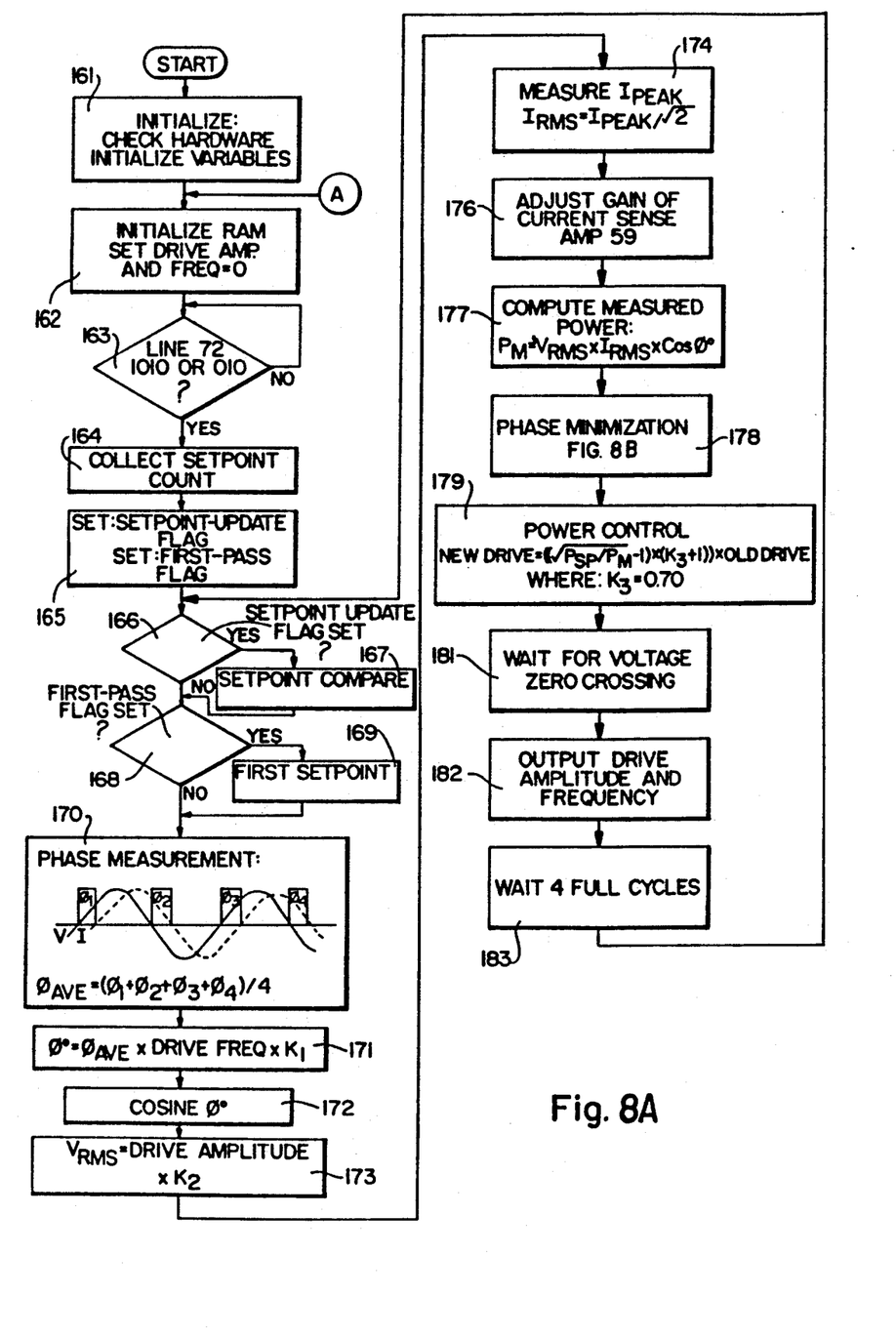
FIGS. 8A and 8B are detailed flow charts of the computational steps of the resonance tracking loop of FIG. 7.
Figure 8B:
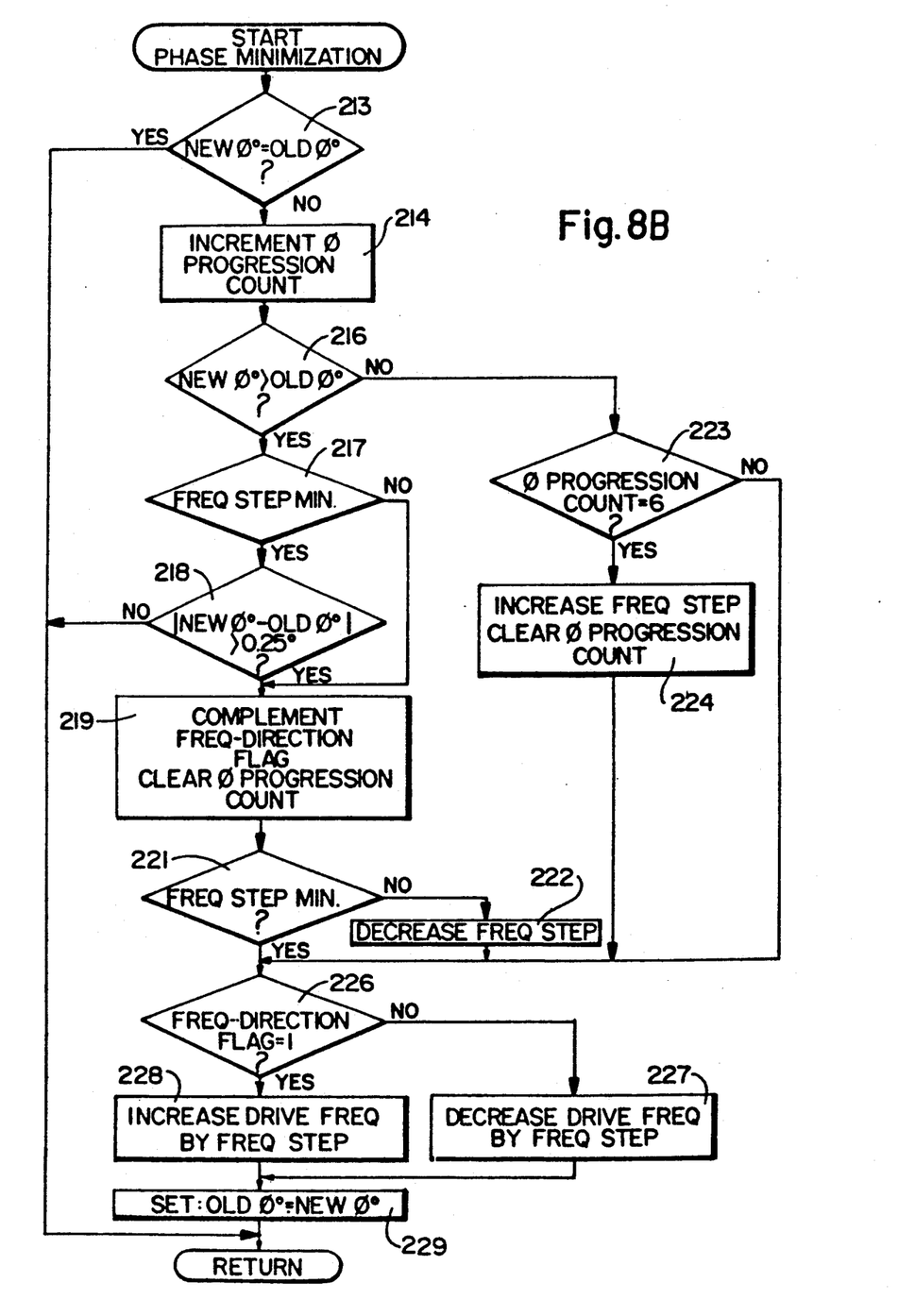

Referring now to FIGS. 8A-8B, the resonance tracking control computational steps performed by CPU 16 according to the present invention will now be described in more detail. As will be appreciated, the flow charts shown in FIGS. 8A-8B are appropriately coded in machine language and are stored in program memory 18 shown in FIG. 3.

After initial power up, control exists in initialization block 161 wherein the hardware system is checked for errors and various flags and variables used in the program are initialized.

Control is then transferred to block 162 which begins the setpoint determination routine. In block 162, working RAM is initialized and the amplitude and frequency of the drive voltage are set to zero. Then, decision block 163 is entered wherein setpoint input line 72 is monitored until the digital sequence 1010 or 010 is sensed. When this digital sequence is sensed, control is transferred to block 164 where the frequency of the signal on line 72 is used to determine the desired setpoint. This is done by counting the pulses appearing on line 72 for 250 msec. Control is then transferred to block 165 where the set-point-update flag and first-pass flag are set.

After having collected the setpoint count, the main loop of the routine is entered beginning with decision block 166. In block 166, if the setpoint-update flag is set, control is transferred to the setpoint compare routine of block 167.

If the setpoint-update flag is not set, control is transferred to decision block 168 where the state of the first-pass flag is sensed. If the first-pass flag is set, indicating that the system has not yet been started, control is transferred to the first setpoint routine of block 169.

On the other hand, if the first-pass flag is not set, control is transferred to block 170 where a phase difference between the drive current and drive voltage is calculated.

In block 170, the pulses on line 71 are monitored by CPU 16 (FIG. 3) to determine the phase difference between the drive voltage and and drive current. The pulse applied on line 71 is used to gate a counter within CPU 16 on and off. To improve accuracy, four phase measurements are taken and averaged. Specifically, $\phi^* = \phi_{AVE} \times \text{DRIVE FREQ} \div K_1$, where $\phi^*$ is the phase difference in degrees, $\phi_{AVE}$, is calculated in block 170 and DRIVE FREQ is the drive frequency calculations for which are described below with reference to FIG. 8B. Control is then transferred to process block 171 where the phase difference measurement taken in block 170 is converted from a number of clock counts to degrees using the equation shown, As shown in block 170, the average phase difference, $\phi_{AVE}$, is calculated using the equation: $\phi_{AVE} (\phi_1 + \phi_2 + \phi_3 + \phi_4)/4$, where $\phi_{1-4}$ are four consequtive phase difference measurements. The constant $K_1$ is used to convert the units of clock count to degrees.

Control then passes to block 172 where the phase angle in degrees calculated in block 171 is used with a look-up table, having 1° steps, to determine the cosine of the phase. Control then passes to block 173 where the RMS value of the drive voltage is calculated from the present voltage amplitude setting. As shown in block 173, the RMS value of the drive voltage, $V_{RMS}$, is calculated using the equation: VRMS DRIVE AMPLITUDE×K$_2$, where: DRIVE AMPLITUDE is calculated in block 179 (described below), and K$_2$ is a constant for converting the drive amplitude to an RMS value.

Control then passes to block 174 where the RMS value of the current is determined. This involves sampling the output of ADC 21 which is a digitized version of the output of current sample/hold circuit 62 (FIGS. 3 and 5). The peak value is multiplied by an appropriate constant to produce the RMS value. Specifically, the RMS value of the current, $I_{RMS}$, is calculated using the equation $I_{RMS}=I_{PEAK}/\sqrt{2}$, where $I_{PEAK}$ is the peak current detected by sample/hold circuit 62. Also in block 174, reset line 66 is activated (FIGS. 3 and 5) after the peak current is sensed.

Control then passes to block 176 where it is determined if the gain of variable gain amplifier 59 (FIGS. 3 and 5) need be modified in order to provide optimum resolution of the current sensing circuitry. In block 176, the appropriate gain for amplifier 59 is calculated and appropriate lines within bus 61 are activated. Control then passes to block 177 where true power is computed using the cosine and RMS values calculated in blocks 712, 173 and 174. Specifically, true power, $P_M$, is calculated using the equation $P_M = V_{RMS} \times I_{RMS} \times \cos\phi^*$, where $V_{RMS}$, $I_{RMS}$ and $\cos\phi^*$ are previously calculated in blocks 173, 174 and 172, respectively.

Control then passes to block 178 where phase minimization is performed. The details of the computational steps of block 178 are shown in FIG. 8B. After exiting block 178, power control is accomplished in block 179. In block 179, the new drive voltage amplitude is calculated using the equation shown. Specifically, the new drive amplitude, NEW DRIVE is calculated from the old drive amplitude, OLD DRIVE, using the equation: NEW DRIVE=$((\sqrt{P_{SP}/P_M}-1)\times(K_3+1))\times$OLD DRIVE, where $P_{SP}$ is the set point power calculated in block 201 (described below), $P_M$ is the detected power calculated in block 177, and $K_3$ is 0.70. The new drive voltage amplitude is proportional to the old drive voltage amplitude multiplied by the square root of the ratio of the desired setpoint power, calculated in block 167, to the measured power, calculated in block 177.

Control then passes to block 181 where a zero crossing of the voltage wave form is awaited. When zero crossing is detected, control passes to block 182 where the newly calculated drive amplitude and drive frequency are output. As mentioned above referring to FIG. 3, amplitude is set using coarse control with PROM 37 and fine control with DAC 22, and frequency is set using the pulse stream on line 26 generated by frequency generator 23 under control of bus 17. Control then passes to block 183 where four full sinusoidal cycles are awaited in order to assure system stability before retracing the loop beginning again with decision block 166.

Referring now to FIG. 8B, the phase minimization routine is disclosed. These process steps are performed in block 178 of FIG. 8A.

Initially, the new phase is compared with the old phase in decision block 213. If the phases are identical, the phase minimization routine is immediately exited and control is returned to block 179 of FIG. 8A. If a difference between the new phase and the old phase is found in decision block 213, control passes to block 214 where the phase progression count is incremented. The phase progression count is an indicator of the degree of the discrepancy between the new phase and the old phase.

Control then passes to block 216 where the relative magnitudes of the new phase and the old phase are determined. If the new phase is greater than the old phase, control passes to block 217 where it is determined if the frequency step size is set to the minimum value. In the preferred embodiment, the minimum frequency step size is approximately 31.2 mHz. Although as mentioned above, the hardware of the preferred embodiment is capable of a minimum frequency step size of 1.7 mHz, it has been determined that a minimum frequency step size of 31.2 mHz is sufficient for the disclosed preferred embodiment. The frequency step size can take one of seven values increasing in a binary progression beginning with the minimum step size (i.e., 31.2 mHz, 62.5 mHz, 125 mHz, 250 mHz, 500 mHz, 1 Hz and 2 Hz). If the frequency step size is minimum, control passes to decision block 218 where it is determined if the magnitude of the difference between the old phase and the new phase is greater than 0.25°. If not, the routine is exited and control returns to block 179 of FIG. 8A.

If the magnitude of the difference between the old phase and the new phase is greater than 0.25°, or if the frequency step size is not at the minimum value, control passes to block 219 where the direction of change in frequency is changed by complimenting the frequency-direction flag. The phase progression count is also cleared in block 219. Control then passes to block 221 where it is determined if the frequency step size is at a minimum. If not, control passes to block 22 where the frequency step size is decreased.

If block 216 determines that the new phase is not greater than the old phase, control passes to decision block 223 where the phase progression count is sensed and determined if equal to six. If so, the frequency step size is increased and the phase progression count is cleared in block 224. Control then passes to block 226. If decision block 223 determines that the phase progression count is not equal to six, control passes directly to block 226 where the frequency-direction flag is sensed. If the frequency-direction flag is not set, indicating that a decrease in drive frequency is required in order to minimize phase, control passes to block 227 where the drive frequency is decremented by the frequency step size. If the frequency-direction flag is set according to block 226, indicating that an increase in drive frequency is required to minimize the phase difference, control passes to block 228 where the drive frequency is incremented by the frequency step size. Control then passes to block 229 where the old phase is set equal to the new phase before returning control to block 179 of FIG. 8A.

As a result of the phase minimization routine of FIG. 8B, the phase difference between the drive voltage and drive current is constantly monitored and the drive frequency adjusted to minimize the phase difference thereby maintaining the vibratory feeder in mechanical resonance.

By using a variable frequency step size, it is possible to use a greater step size when there is a large discrepancy between the phases of the current and voltage, or if drifting away from phase minimization is sensed. This condition is reflected by a large phase progression count. On the other hand, a very fine frequency step size is used if the phase difference indicates operation very near the mechanical resonant frequency. This condition is reflected by a small phase progression count.

The above detailed description is offered by way of example and not by way of limitation. Those skilled in the art may modify the disclosure without departing from the spirit and scope of the present invention. Accordingly, the present invention is to be limited only by the appended claims.

What is claimed is:

1. Control apparatus for a vibratory feeder system for moving material, the vibratory feeder system including a vibratory feeder having a tray for supporting the material to be moved and an electromagnetic actuator responsive to a drive signal having a controllable amplitude and frequency for applying a vibratory force to said tray to produce oscillatory displacement of said tray having a displacement amplitude and displacement frequency, and the vibratory feeder system having a resonance frequency; the control apparatus comprising:

means for continuously applying said drive signal to the actuator;

first control means for controlling said drive signal amplitude to control said displacement amplitude, said first control means operating at a first predetermined cycle rate to update said drive signal amplitude; and second control means for controlling said drive signal frequency to control said displacement frequency, said second control means operating independently of said first control means and at a second predetermined cycle rate substantially less than said first cycle rate to update said drive signal frequency.

2. The control apparatus of claim 1, wherein said second control means includes:

voltage detector means for detecting the voltage of said drive signal;

current detector means for detecting the current of said drive signal;

phase detector means for detecting the phase angle between said detected drive signal voltage and drive signal current during each frequency control cycle; and phase angle reducing means for reducing said phase angle detected by said phase detector means, such that said drive signal frequency is substantially equal to said resonance frequency of the vibratory feeder system.

3. The control apparatus of claim 1 wherein said first control means includes:

displacement sensor means separate from said second control means for sensing physical displacement of the tray and producing an output proportional thereto;

means for detecting the peak amplitude of said displacement sensor means output during each displacement control cycle;

means for comparing said detected peak amplitude with a desired displacement amplitude; and means responsive to said comparing means for changing said drive signal amplitude to reduce the difference between said detected peak amplitude and said desired displacement amplitude.

4. A method for controlling a vibratory feeder system for moving material, the vibratory feeder system including a vibratory feeder having a tray for supporting the material to be moved and an electromagnetic actuator responsive to a drive signal having a controllable amplitude and frequency for applying a vibratory force to said tray to produce oscillatory displacement of said tray having a displacement amplitude and displacement frequency, and the vibratory feeder system having a resonance frequency; the control method comprising the steps of:

continuously applying said drive signal to the actuator;

controlling said drive signal amplitude to control said displacement amplitude by updating said drive signal amplitude at a first predetermined cycle rate; and controlling said drive signal frequency to control said displacement frequency independently of controlling said drive signal amplitude by updating said drive signal frequency at a second predetermined cycle rate substantially less than said first cycle rate.

5. The method of claim 4, wherein said drive signal frequency controlling step comprises the steps of:

detecting the voltage of said drive signal;

detecting the current of said drive signal;

detecting the phase angle between said detected drive signal voltage and drive signal current during each frequency control cycle;

reducing said detected phase angle such that said drive signal frequency is substantially equal to said resonance frequency of the vibratory feeder system.

6. The method of claim 4 wherein said drive signal amplitude controlling step comprises the steps of:

sensing physical displacement of the tray and producing an output proportional to the amplitude thereof;

detecting the peak amplitude of said sensed displacement output during each displacement control cycle;

comparing said detected peak amplitude with a desired displacement amplitude; and changing said drive signal amplitude to reduce the difference between said detected peak amplitude and said desired displacement amplitude.

* * * * *